United States Patent [19]

Forgacs et al.

[11] 3,873,416
[45] Mar. 25, 1975

[54] SYSTEM FOR THE CONTINUOUS MEASUREMENT OF THE WEIGHT-AVERAGE FIBER LENGTH OF A PULP

[75] Inventors: Otto L. Forgacs, 15 Apple Hill Rd., Baie d'Urfe, Quebec; Alkibiadis Karnis, 487 Montcalm Ave., Dollard des Ormeaux, Quebec, both of Canada

[73] Assignee: Alkibiadis Karnis, Dollard des Ormeaux, Quebec, Canada

[22] Filed: Oct. 3, 1973

[21] Appl. No.: 403,122

Related U.S. Application Data

[63] Continuation of Ser. No. 201,310, Nov. 23, 1971, Pat. No. 3,802,964.

[30] Foreign Application Priority Data
Nov. 27, 1970 Canada .................................. 99380

[52] U.S. Cl. ........................ 162/49, 73/63, 162/263
[51] Int. Cl. ............................................. G01n 1/18
[58] Field of Search .......... 162/263, 198, 258, 259, 162/49, DIG. 6; 137/92; 210/388; 73/63, 61 R, 61.1

[56] References Cited
UNITED STATES PATENTS

| | | |
|---|---|---|
| 2,505,513 | 4/1950 | Young et al. .................. 210/388 X |
| 2,734,378 | 2/1956 | Meyers .......................... 162/263 X |
| 3,058,672 | 10/1962 | Zabel ................................ 73/63 X |
| 3,110,172 | 11/1963 | Irwin ................................. 73/63 X |
| 3,372,087 | 3/1968 | Richter ......................... 210/388 X |
| 3,589,980 | 6/1971 | Salomon ............................ 162/258 |
| 3,802,964 | 4/1974 | Forgacs et al. ..................... 162/263 |

Primary Examiner—S. Leon Bashore
Assistant Examiner—Richard V. Fisher
Attorney, Agent, or Firm—C. A. Rowley

[57] ABSTRACT

A method and apparatus are disclosed which permit the "on-line" measuring of the properties of a pulp, notably the weight-average fibre length of a mechanical pulp. The pulp is passed through a specially devised stock fractionator and the readings or signals from this instrument are used, e.g., in a suitably programmed computing device, to obtain the value of the weight-average fibre length of the pulp. The stock fractionator used is a self-cleaning screen of a suitable mesh size by means of which the pulp is split into a retained fraction of a through fraction. The weight ratio of one of the fractions to the feed is related to the L-factor of the pulp.

6 Claims, 2 Drawing Figures

SYSTEM FOR THE CONTINUOUS MEASUREMENT OF THE WEIGHT-AVERAGE FIBER LENGTH OF A PULP

This is a Continuation, of application Ser. No. 201,310, filed Nov. 23, 1971, now U.S. Pat. No. 3,802,964.

FIELD OF INVENTION

The present invention relates to a method and apparatus for the continuous on-line monitoring of the properties of papermaking pulps. More particularly, the invention relates to a method and apparatus for determining more accurately the values of selected parameters indicative of the properties of pulps, particularly of mechanical pulps.

DESCRIPTION OF PRIOR ART

Equipment is currently available for the continuous on-line measurement of such pulp properties as consistency and freeness. These meters do not measure a single property to obtain their reading, and thus the output of the meter is dependent partially on the property to be measured but also depends on other pulp properties. The accuracy of the meter is dependent on its ability to discriminate between the property to be measured and the other properties affecting the measurement. For example, known on-line consistency meters are affected among other things by both changes in consistency and in freeness as are the freeness meters.

It is not believed that there is any equipment available for continuously measuring the weight average fibre length of the pulp, yet this is an important property in particular in relation to ground pulp.

SUMMARY OF INVENTION

The present invention measures the properties mentioned above, namely the consistency, freeness and weight average fibre length by measuring consistency and freeness with known meters and measuring the weight average fibre length with a new device to obtain a value for each of these properties. By combining these three properties and solving a set of simultaneous equations determined for the specific meters used it has been found that the accuracies of the values for all three of these properties may be improved.

In some cases, the on-line consistency meter may be omitted, i.e., where consistency is already known or where accuracy beyond the dependability of the on-line meters is required. In the latter case, consistency may be established by a lab practice, however, continuous on-line readings will then not be available, but due to the accuracy of the consistency measurement, the freeness and weight average fibre length values will also be more accurate using the system disclosed hereinbelow. In fact, with complete accuracy of the consistency value it is believed the values for freeness and weight average fibre length will be substantially as accurate as those obtained using laboratory techniques.

The terms "true" or "true value," when used herein with reference to specific surface, or weight average fibre length, or consistency denote the corrected value of the respective property which value more closely approaches that obtained by measuring using current laboratory methods on the basis of the standard definitions of the respective properties than the reading of the respective instruments taken independently.

By "length factor" (sometimes referred to as L-factor) will be understood the sum of the percentages of fibres of a mechanical pulp which are retained on the 14-, 28- and 48-mesh screens of a Bauer-McNett fractionator, substantially as defined in the paper by O. L. Forgacs, Pulp & Paper Magazine of Canada, 64C 1963, page 189.

By mechanical pulps, in the context of this disclosure, are understood pulps derived from wood by mechanical action in the presence of water, and the term as herein used will include groundwood, which is prepared by means of grinders, as well as refiner pulp which is generally prepared by the disc refining of wood chips.

The above and other objects will be realized by the present invention which provides a method for the continuous on-stream determination of the specific surface and the weight-average fibre length and, if desired, the true consistency of a pulp. The method comprises feeding a suspension of the pulp of known consistency to a series of measuring stations including at least a freeness analyzer and a stock fractionator susceptible of continuous operation; obtaining a reading from said freeness analyzer, said reading being an indirect measure of the specific surface of the fibres and at the same time reflecting other characteristics of said stock, including the consistency and the weight-average fibre length; obtaining a reading from said stock fractionator, said reading being an indirect measure of the weight-average fibre length and at the same time reflecting other characteristics of said stock including particularly the consistency; solving a set of simultaneous equations wherein said readings are parameters and the true values of specific surface and weight-average fibre length are the unknowns; to obtain the said true values of specific surface and weight-average fibre length. The method also provides for pulps of unknown consistency by further including in said series of measuring stations a consistency meter susceptible of continuously measuring consistency; obtaining from said meter a reading of consistency, said reading being an indirect measure of the true consistency and at the same time reflecting other characteristics of said pulp including the specific surface and the weight-average fibre length; solving a set of equations wherein said reading of consistency is a further parameter and the true consistency is a further unknown; to obtain for specific surface, weight-average fibre length and true consistency.

The invention also provides an apparatus for the continuous onstream determination of the specific surface and the weight-average fibre length and, if desired, the true consistency of a pulp. The apparatus comprises a freeness analyzing means and a stock fractionating means; means for feeding a pulp suspension to each of said means, said freeness analyzing means and said stock fractionating means providing readings which indirectly measure respectively the specific surface and the weight-average fibre length and at the same time reflect other characteristics of said pulp; computing means adapted to solve a set of simultaneous equations wherein said readings are parameters and the values of the specific surface and the weight-average fibre length are the unknowns; and means for feeding said readings to the computing means thereby to solve the equations for the unknowns. The apparatus further comprises consistency measuring means adapted to provide a reading of consistency, said reading being an indirect measure of true consistency and at the same time reflecting other characteristics of said pulp; computing means adapted to solve a set of equations wherein said reading of consistency is a further parameter and the true consistency is a further unknown; and means for feeding said third reading to said computing means.

The invention also provides a continuous method of measuring the weight-average fibre length, in which method a flow of a pulp suspension of known consistency and at a given rate of flow and at a given temperature is fed against a vertically mounted, vibratable, self-cleaning screen of a preselected mesh size, thereby to fractionate the pulp into a retained fraction and a through fraction, at least one of said fractions is collected, the weight of the said collected fraction is determined, thereby to determine th weight ratio of said fraction to the pulp in said pulp suspension, said ratio being an indirect measure of said weight-average fibre length.

BRIEF DESCRIPTION OF DRAWINGS

The invention will now be more fully understood from the following description and the accompanying drawings in which like reference numbers designate like parts or components and wherein.

DESCRIPTION OF THE PREFERRED EMBODIMENT

Figure 1:
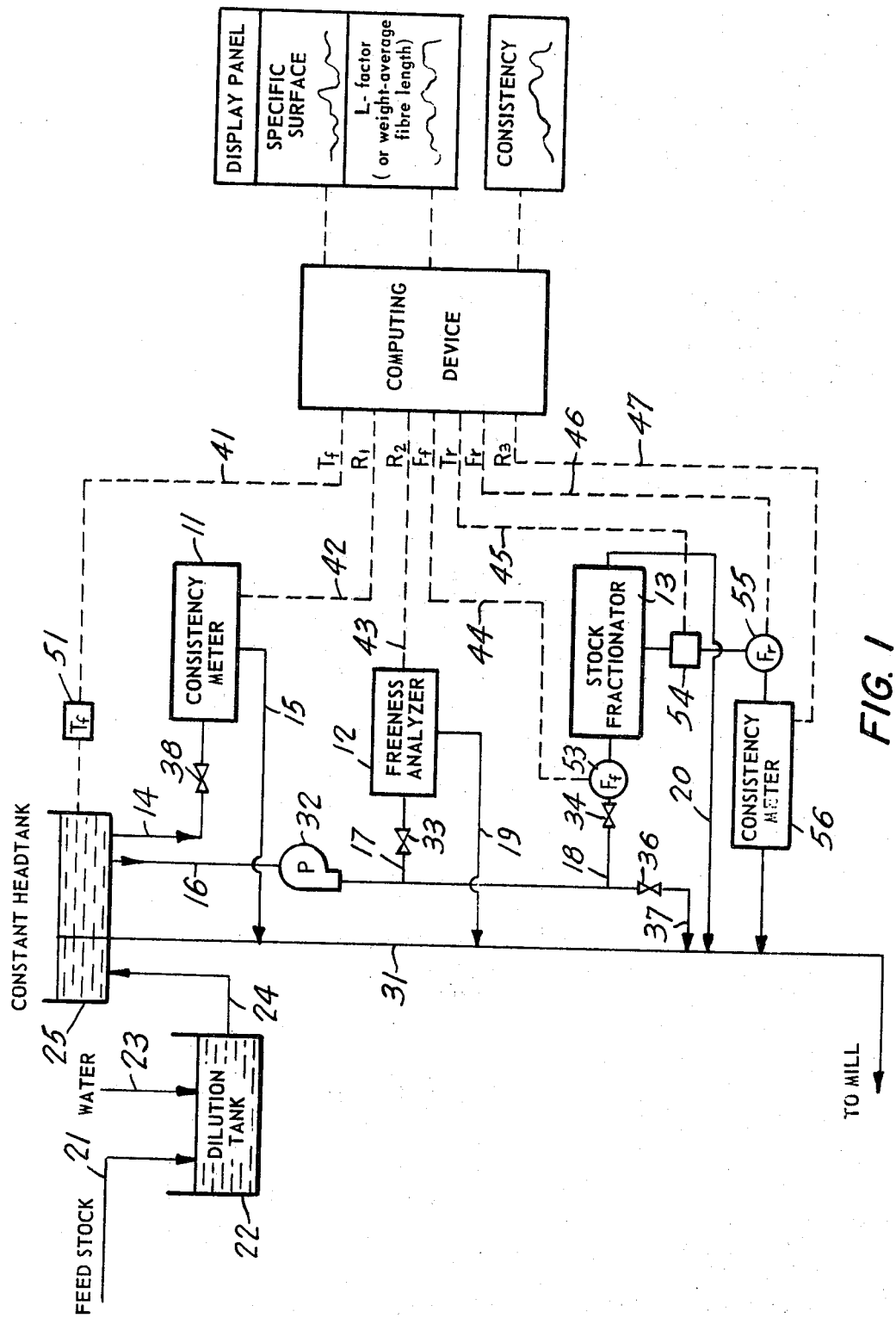
FIG. 1 is a schematic diagram of an apparatus constructed in accordance with the basic concept of the present invention.

Referring now to FIG. 1, an embodiment of the combination of the present invention consists of consistency metering means 11, freeness analyzer 12 and stock fractionator 13 set out as shown. A sample of feed stock is continuously removed from the process (e.g., from the grinder room or groundwood refiners as the case may be) and sent through line 21 to a dilution tank 22 to which dilution water is admitted through line 23. The stock sample is thus diluted to a predetermined consistency range, preferably between .4 and 1.0%.

The dilute stock is fed through line 24 into constant head tank 25 from where it is made to flow continuously to the three major components of the system, the overflow from said tank being returned to the mill system through collector line 31. Thus feed line 14 and valve 38 provide for the flow of stock from the head tank to consistency metering means 11 whence the stock returns to the mill system via line 15 and collector line 31. Feed line 16 provides for the flow of stock to pump 32 which supplies the stock via line 17 to the freeness analyzer and via line 18 to the stock fractionator valves 33 and 34 being provided to control the respective flows. By-pass line 37 with valve 36 is provided to make possible the maintaining of a constant output pressure on the pump. The stock returns from the freeness analyzer via line 19 and from the stock fractionator via line 20 and travels back to the mill system via the collector line 31. The flow to the fractionator is measured by means of flowmeter 53, which may be any of the various flowmeters commercially available, e.g., a magnetic flowmeter; and the temperature, flow and consistency of one of the fractions, e.g., of the retained fraction, are measured respectively by means of thermometer 54, flowmeter 55 and consistency meter 56. The temperature is measured at 51 and wherever suitable.

The consistency meter used may be one of the several types of apparatus now available in commerce and suitable for the on-line measuring and providing of an index of consistency. An example is the Brookfield consistency meter which essentially measures the torque on a rotating spindle driven at a constant speed by a synchronous rotor. The spindle is suspended in a measuring chamber to which a constant volume of the pulp suspension is delivered by a constant head device or a positive displacement pump. The flow is perpendicular to the apex of the cone-shaped free end of the spindle, and the suspension overflowing from the measuring chamber is recirculated by means of the pump. The apparatus is generaally calibrated so that a curve of consistency corresponds to the scale of torque reading which the apparatus registers. The readings will, of course, depend on process conditions such as the temperature and the rate of flow and these conditions will therefore be standardized for the test or be allowed for in the reading. Any other "on-line" consistency metering device may be used. All such consistency metering devices as are now available have this in common, that they measure directly some measurable property of the fibre suspension, such as e.g., resistance to flow, shear force, dielectric constant, optical properties or the like, and the reading of that particular property is translated into a consistency reading by appropriate calibration.

It will be appreciated that the readings provided by such instruments, while providing a useful indirect measure of consistency, reflect not only consistency but also other properties of the pulp, primarily fibre length and specific surface, and therefore constitute a sort of combined index even though primarily responsive to changes in consistency. It is necessary to keep this in mind, for the operator may often be led into error by too direct or literal an interpretation of the readings of this type of apparatus. Thus, consistency readings provided by such apparatus will change radically when the other properties of the pulp have changed, e.g., when owing to changes in the conditions of the process the average fibre length and/or specific surface of the fibre has changed, even though the true consistency has not changed. The reaction of the operator to a change in the consistency reading might (and usually will) be an attempt to revert to the initial consistency by adding or subtracting fibre to or from the suspension. This will obviously alter the true consistency and the operator may end up with a basis weight completely different from the one desired.

Continuous freeness analyzers for on-line measuring of freeness are also available. These instruments provide essentially an indication of the rate at which the pulp suspension is drained or de-watered; the physical property of the pulp primarily influencing the drainage rate is the specific surface of the fibres. An example of such an on-line freeness analyzer is the Baily freeness analyzer, based on the behaviour of the stock suspension in a miniature decker or thickener. It consists essentially of a dandy roll rotating at constant speed in a chamber in contact with a pool of a pulp suspension at controlled consistency and maintained at a constant level. As the roll rotates, a cake is formed on the screened surface of the roll as it passes in contact with the pulp suspension, and the white water extracted from the pulp in forming the cake is removed. The rate of formation of the cake, and hence the flow of stock entering the pool to maintain it at constant level, depends on the freeness of the stock. It is this flow of stock, entering the instrument in replacement of the fibres deposited on the roll, that provides the reading which serves as an index of freeness. It will be apparent that this flow and the reading reflecting it, will depend also on other properties or conditions, particularly on the fibre length distribution, as well as the consistency of the stock, and the temperature. Other freeness analyzers are similarly based on the measuring of the drainage or dewatering rate of the pulp suspension.

A known laboratory method of measuring the weight-average fibre length of a mechanical pulp is by the use of a Bauer-McNett fractionator. On the basis of the fibre-length classification data obtained in this apparatus, such as the percent of pulp retained on screens of a certain mesh size, namely 28 mesh, between 28 and 48 mesh, and between 48 and 100 mesh, approximate integral fibre length distribution curves of any mechanical pulp can be obtained. (O.L. Forgacs, The Characterization of Mechanical Pulps, PPRIC, 1963, Appendix B.) It was found that the fibre length distribution curve associated with any given weight-average fibre length is reasonably constant for pulps made by any given process of making mechanical pulp. This meant that fibre length could be described to a good approximation by a single number and on this basis a simplified method of determining the weight-average fibre length was devised. In this method only the total weight of the pulp retained on the 48 mesh screen (the so-called "length factor" or L) is determined, this being sufficient for a determination with sufficient accuracy of the weight-average fibre length of the pulp. A practical method of measuring continuously the L factor has now been devised for use in the present invention, in which method a flow of pulp suspension of known finite consistency (preferably of the order of 0.4 to 1.5%) is directed against a vertically mounted screen of a suitable mesh size, thereby dividing the pulp into two fractions, a long-fibre fraction retained on the screen and a shortfibre fraction passing through the screen. The retained fraction is collected and its weight determined. Under constant conditions, i.e., for a given rate of flow, temperature, etc., the weight ratio of fibres retained on the screen to fibres in the feed (or, for that matter, the ratio by weight of fibres passed through the screen to fibres in the feed) is a function of the weight-average fibre length; the said ratio thus can be used to find the corresponding L-factor, or if desired, in lieu of the L-factor as an index of the said weight-average fibre length. However, it will be apparent that the amount of retained fibres, and hence the ratio of retained fibres to feed, is also affected by such other properties of pulp and process conditions, as the consistency of the feed and the flow rate.

Figure 2:
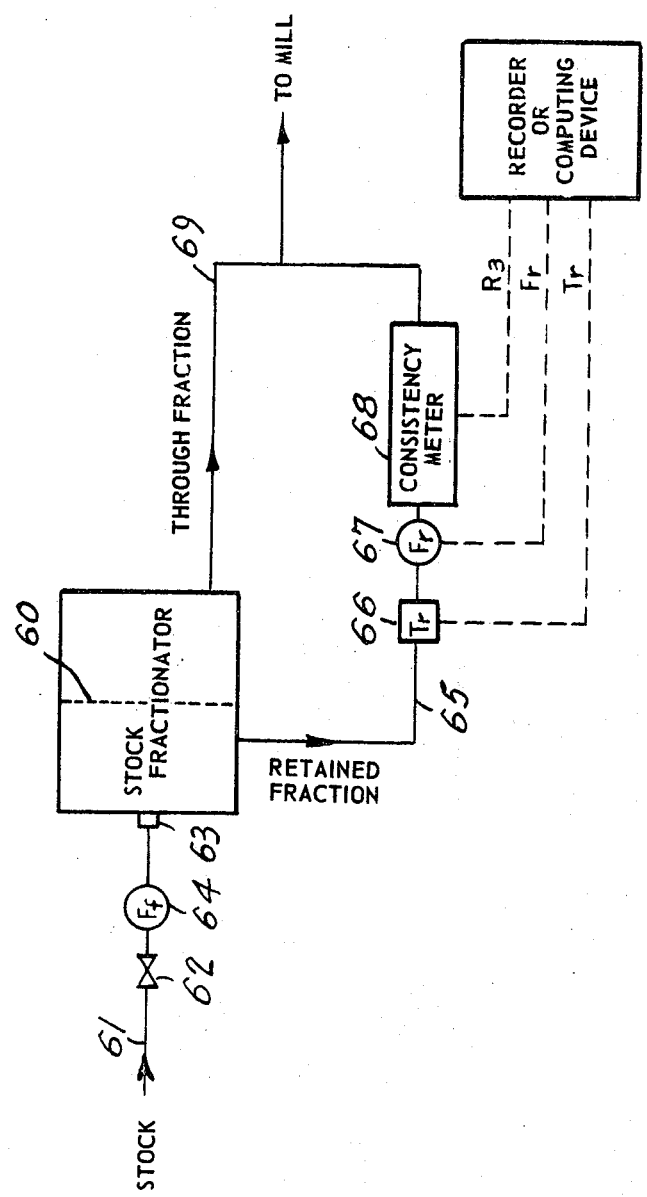
FIG. 2 is a schematic representation of one element of the present combination, namely a screening device functioning as a stock fractionator or classifier.

The device is illustrated in the drawings in FIG. 2 where numeral 60 represents a self-cleaning screen made, e.g., of nylon and mounted in a box at a suitable angle for self-cleaning, preferably vertically. The pulp suspension is fed through line 61, the flow in which can be regulated by means of valve 62 and measured by flowmeter 64, and the stock is sprayed onto the screen by means of nozzle 63 or a similar device. An example of a screen assembly found suitable for this operation is a Celleco screen assembly equipped with a screen of mesh size to split the feed stock into substantially equal fractions. A screen of 50 mesh size provides, in the case of mechanical pulps from Eastern Canadian and Scandinavian soft-wood species, an adequate split of the fibres for accurate measurement, but other mesh sizes can be used depending on the estimated fibre length distribution provided that each fraction represents a substantial proportion of the initial stock. The screen is generally subjected to rapid vibrations and is self-cleaning so that no mat or cake of retained fibres is formed on it.

The retained fraction (or, if preferred, the through fraction) is collected (and, if necessary, diluted by addition of dilution water) and conducted via line 65, fitted with a temperature measuring device 66 and a flowmeter 67, into a consistency measuring device 68, of a type as described hereinabove. The weight of the pulp in the retained fraction is determined from these flow and consistency measurements. When the consistency and flow of the feed stock is also known the weight ratio of the retained fraction (or, if preferred, the through fraction) to the feed, is easily determined. From this ratio the L-factor is determined, e.g., from a family of prepared calibration curves or in like manner, and if desired the weight-average fibre length is further determined.

Continuous readings are thus obtained for what may be called apparent consistency, freeness and L-factor (or weight-average fibre length). At the same time readings are obtained of the rate of flow of the feed to the fractionator and of the flow and consistency of the retained fraction as well as of the temperature at the various points in the system. The readings thus obtained will provide parameter data for a set of simultaneous equations in which the true values of the pulp variables, namely the specific surface of the fibres, the weight-average fibre length and, as in the embodiment illustrated, the consistency, are the unknowns and in which the number of unknowns is equal to the number of equations, so that the set of equations is soluble. The number of parameters and of unknowns can obviously be greater than here described, this however will render the system more complicated.

A simple computing device is provided, as shown in FIG. 1, which will be adapted to solve a set of equations as described. To this device will be fed the readings obtained from the particular instruments, namely: the temperature of the feed stock $T_f$, the reading of the feed stock consistency meter $R_1$, the reading of the freeness analyzer $R_2$, the flow of the stock $F_f$, and the temperature $T_r$, flow $F_r$, and consistency reading $R_3$ of the retained fraction as indicated by the respective broken lines 41, 42, 43, 44, 45, 46 and 47. The equations relating the readings of the various instruments to the pulp variables and the variables between themselves are set out below in equations 1 to 9.

Definition of Symbols $R_1$ = Feed consistency meter reading
$R_2$ = Freeness analyzer reading
$R_3$ = Consistency meter reading of retained fraction
$R_4$ = Amount of pulp retained by the screen (% of feed)
$C_f$ = True consistency of the stock (% o.d. fibres per unit weight of stock)
$C_r$ = True consistency of the retained fraction
$F_f$ = Flow (lb/min) of feed stock
$F_r$ = Flow (lb/min) of retained fraction $L_f$ = L-factor (total percent by weight retained by the 48-mesh screen of a Bauer-McNett Classifier) of feed $L_r$ = L-factor of retained fraction $\sigma_f$ = Specific surface of the fibres (m²/g) in the feed stock $\sigma_r$ = Specific surface of the fibres (m²/g) in the retained fraction $T_f$ = Temperature (°F) of the feed stock $T_r$ = Temperature (°F) of the retained fraction $G_f$ = Canadian Standard Freeness (mls) of feed stock The Equations $$R_1 = R_1 (C_f, L_f, \sigma_f, F_f, T_f) \quad (1)$$

$$R_2 = R_2 (L_f, \sigma_f, C_f, T_f) \quad (2)$$

$$R_3 = R_3 (C_r, L_r, \sigma_r, F_r, T_r) \quad (3)$$

$$R_4 = 100 \times C_r F_r / C_f F_f \quad (4)$$

$$R_4 = R_4 (L_f, C_f) \quad (5)$$

$$L_r = L_r (L_f, C_f)$$

$$\sigma_r = \sigma_r (\sigma_f)$$

$$G_f = G_f (\sigma_f, L_f) \quad (8)$$

Combining Equations (3), (4), (5), (6) and (7) we obtain:

$$R_3 = R_3 (T_r, \sigma_f, L_f, C_f, F_f, F_r) \quad (9)$$

The set of equations to be solved is:

$$R_1 = R_1 (C_f, L_f, \sigma_f, F_f, T_f) \quad (1)$$

$$R_2 = R_2 (L_f, \sigma_f, C_f, T_f) \quad (2)$$

$$R_3 = R_3 (C_f, \sigma_f, L_f, T_r, F_f, F_r) \quad (9)$$

If the process characteristics, namely stock temperatures $T_f$ and $T_r$ and flows $F_f$ and $F_r$ are controlled to maintain them constant, equations (1), (2) and (9) may be inverted to provide three equations expressing theh properties of consistency, specific surface and L-factor as a linear function of the respective meter readings $R_1$, $R_2$ and $R_3$, thus:

$$C_f = \alpha_0 + \alpha_1 R_1 + \alpha_2 R_2 + \alpha_3 R \quad (10)$$

$$\sigma_f = \beta_0 + \beta_1 R_1 + \beta_2 R_2 + \beta_3 R_3 \quad (11)$$

$$L_f = \gamma_0 + \gamma_1 R_1 + \gamma_2 R_2 + \gamma_3 R_3 \quad (12)$$

where $\alpha$, $\sigma$, and $\gamma$ are constants which have been determined experimentally and are essentially characteristics of the apparatuses used for obtaining the meter readings. It is this set of equations that is solved by the computing device, the inputs into the device being the readings $R_1$, $R_2$ and $R_3$, and the output from the device providing the true values of consistency, weight-average fibre length, and specific surface of the fibres. These values can be made to appear on a display panel for easy reading by the operator.

Computing devices suitable for solving equations of the type shown above are well known in the art. These computing devices may be of the digital type or the analog type, both of which are readily available and have already found many and varied applications for process control in chemical and allied industries. The principles of an analog computer suitable for use with the present invention are described, e.g., in the textbook "Process Systems Analysis and Control," by D. R. Coughanowr and L. B. Koppel (McGraw-Hill, 1965). It will be understood that in a computing device of this type the setting of the potentiometers (the function of which is to carry out the multiplication operation) will be determined by the value of the constants $\alpha$, $\beta$ and $\gamma$, the amplifiers will be set up to carry out the summation of the terms and so on, in a manner that will be known to the man skilled in the art.

Example

A number of different pulps (stone and refiner groundwoods as well as chemi-mechanical pulps) were run through a system consisting of a Brookfield consistency meter, a Baily freeness analyzer, and a stock fractionator consisting of a Celleco screen having a mesh size 50, substantially as described hereinabove.

The range of variables investigated was:

| | | |
|---|---|---|
| L-factor | from | 13% to 40% |
| CS Freeness | " | 20 to 400 |
| Specific surface | " | 3 m²/g to 9 m²/g |
| Consistency | " | .3% o.d. to 1% o.d. |
| Stock temperature | " | 70°F to 150°F |

Using regress on analysis, and for a constant value of the flows, the following set of equations was obtained:

$$R_1 = 28.7 + 17{,}950\, C_f - 0.15\, T_f - 2.88\, \sigma_f - 40\, L_f \quad (1a)$$

$$R_2 = 47.1 + 0.074/C_f + 0.112\, T_f + 8.8\, \sigma_f + 269\, L_f - 36.8\, \sigma_f L_f \quad (2a)$$

$$R_3 = 20.5 - 0.15\, T_r - 1.73\, \sigma_f - 41\, L_f - 2900\, C_f + 337 \times 10^4\, C_f^2 + 2.7 \times 10^4\, C_f L_f - 162.7 \times 10^6\, C_f^3 - 3.76 \times 10^6\, L_f C_f \quad (9a)$$

The Canadian Standard Freeness was calculated from Equation (8) which can be written in the form $$G_f = 218 - 66.6\, \sigma_f + 710\, L_f - 88\, L_f \sigma_f - 5.7\, \sigma_f^2 \quad (8a)$$

The stock temperature was controlled to $T_f = 140°F$ and $T_r = 100°F$, by regulating the dilution water temperature. Under these conditions, inversion of Equations (1a), (2a) and (9a) yields Equations (10a), (11a) and (12a) in which the properties $C_f$, $\sigma_f$ and $L_f$ are expressed as a function of the meter readings $R_1$, $R_2$ and $R_3$. These equations in lineara form are:

$$C_f = 0.55 - 0.0074\, R_1 - 0.0042\, R_2 + 0.010\, R_3 \quad (10a)$$

$$\sigma_f = 1.7 + 0.39\, R_1 + 0.014\, R_2 - 0.33\, R_3 \quad (11a)$$

$$L_f = 1.0 - 0.15\, R_1 + 0.23\, R_2 + 0.44\, R_3 \quad (12a)$$

An unknown mechanical pulp was then passed through the system and readings $R_1$, $R_2$ and $R_3$ registered by the instruments. The readings were:

$$R_1 = 68.5$$
$$R_2 = 50$$
$$R_3 = 67$$

The recorded values for $R_1$, $R_2$ and $R_3$ were substituted in equations (10a), (11a) and (12a), and on solving the values for $L_f$, $C_f$ and $\sigma_f$ were obtained:

$$L_f = 30\%$$
$$C_f = 0.51\%$$
$$\sigma_f = 5.9 \text{ m}^2/\text{g}$$

Canadian Standard Freeness $G_f$ was calculated from equation (8a), giving a value of:

$$G_f = 79 \text{ ml}.$$

The advantages of the present invention will be easily perceived by those skilled in the art. The system allows the true values of the important stock variables to be obtained continuously, quickly and substantially automatically. Moreover, the measurements are carried out on bulk samples of pulp (not on individual fibres, ensuring that a representative sample of the main stock is being taken. The system incorporates a continuous method of measuring weight-average fibre length, as opposed to number-average fibre length, the former being far more important for the characterization of mechanical pulps.

What we claim is:

1. The continuous method of providing a measurement of weight-average fibre length of a pulp comprising feeding a pulp suspension to a fractionator, dividing said pulp into a retained fraction and a through fraction in said fractionator, measuring the flow and consistency of said suspension, measuring the flow and consistency of one of said fractions thereby to obtain a ratio by weight of solids in said suspension and in said one fraction, said ratio being an indirect measure of the weight average fibre length of said pulp.

2. A continuous method of providing a measurement of the weight-average fibre length of a pulp comprising feeding a pulp suspension to a fractionator, dividing said pulp into a retained fraction and a through fraction in said fractionator, measuring the flow and consistency of each of said retained and said through fractions thereby to obtain a ratio by weight of solids in said retained fraction and said through fraction said ratio being an indirect measure of the weight average fibre length of said pulp.

3. An apparatus for measuring the weight-average fibre length of a pulp comprising a stock fractionating means including a selfcleaning screen, means to feed a pulp suspension to said selfcleaning screen to fractionate said pulp into a retained fraction and a through fraction, means for measuring the flow and consistency of said suspension, means for measuring the flow and consistency of one of said fractions thereby to obtain a ratio by weight of solids in said suspension and said one of said fractions, said ratio being an indirect measure of the weight average fibre length of said pulp.

4. The apparatus as defined in claim 3 wherein said apparatus further comprises means for deriving the ratio of solids in said suspension to solids in said one of said fractions.

5. An apparatus as defined in claim 4 wherein said selfcleaning screen is substantially vertically mounted and further comprising means to vibrate said screen.

6. An apparatus for measuring the weight average fibre length of a pulp comprising a stock fractionating means including a selfcleaning screen, means to feed a pulp suspension to said selfcleaning screen to fractionate said pulp into a retained fraction and a through fraction, means for measuring the flow and consistency of said retained fraction, means for measuring the flow and consistency of said through fraction thereby to obtain a ratio by weight of solids in said retained fraction to solids in said through fraction, said ratio being an indirect measure of the weight average fibre length of said pulp.

* * * * *

UNITED STATES PATENT OFFICE
CERTIFICATE OF CORRECTION

Patent No. 3,873,416        Dated March 25, 1975

Inventor(s) Otto L. Forgacs et al.

It is certified that error appears in the above-identified patent and that said Letters Patent are hereby corrected as shown below:

On the cover sheet delete "[73] Assignee: Alkibiadis Karnis, Dollard des Ormeaux, Quebec, Canada".

Signed and Sealed this eleventh Day of May 1976

[SEAL]

Attest:

RUTH C. MASON
*Attesting Officer*

C. MARSHALL DANN
*Commissioner of Patents and Trademarks*